United States Patent
Akiba (10) Patent No.: US 9,405,938 B2
(45) Date of Patent: Aug. 2, 2016

(54) INFORMATION PROCESSING APPARATUS, METHOD FOR RELEASING RESTRICTION ON USE OF STORAGE DEVICE, AND STORAGE MEDIUM

(71) Applicant: CANON KABUSHIKI KAISHA, Tokyo (JP)

(72) Inventor: Tomohiro Akiba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/713,456

(22) Filed: Dec. 13, 2012

(65) Prior Publication Data

US 2013/0160077 A1 Jun. 20, 2013

(30) Foreign Application Priority Data

Dec. 15, 2011 (JP) ................................. 2011-274605

(51) Int. Cl.
G06F 21/78 (2013.01)
G06F 21/30 (2013.01)
G06F 21/57 (2013.01)

(52) U.S. Cl.
CPC ............. *G06F 21/78* (2013.01); *G06F 21/30* (2013.01); *G06F 21/575* (2013.01)

(58) Field of Classification Search
CPC ............................. G06F 21/31; H04L 63/083
USPC .................................................. 726/2
See application file for complete search history.

(56) References Cited

U.S. PATENT DOCUMENTS

| 4,829,169 A | * | 5/1989 | Watanabe | ............ G06Q 20/341 235/380 |
| 4,835,672 A | * | 5/1989 | Zenk | ....................... G06F 13/18 711/150 |
| 5,060,101 A | * | 10/1991 | Isomura | ................ G11B 21/22 360/254.1 |
| 5,623,637 A | * | 4/1997 | Jones | ................. G06F 12/1466 710/13 |
| 5,793,952 A | * | 8/1998 | Limsico | ......................... 726/18 |
| 5,802,176 A | * | 9/1998 | Audebert | ..................... 713/184 |

(Continued)

FOREIGN PATENT DOCUMENTS

CN 1476580 A 2/2004
JP 2006023943 A 1/2006

(Continued)

OTHER PUBLICATIONS

Juan-hua et al.; PD lock software design based on removable storage device and dynamic password; Published in: Computer Engineering and Technology (ICCET), 2010 2nd International Conference on (vol. 3 ); Date of Conference:Apr. 16-18, 2010; pp. V3-326-V3-329; IEEE Xplore.*

(Continued)

*Primary Examiner* — Bradley Holder
(74) *Attorney, Agent, or Firm* — Canon USA, Inc., IP Division (57) ABSTRACT

An information processing apparatus includes an authentication information storage unit that stores authentication information for releasing restriction on use of a storage device, a release unit that releases the restriction on use of the storage device based on the authentication information, a generation unit that generates new authentication information for releasing the restriction on use of the storage device, and a setting unit that, after the restriction on use of the storage device is released, set the new authentication information in the storage device.

8 Claims, 5 Drawing Sheets

(56) References Cited

U.S. PATENT DOCUMENTS

| | | | | |
|---|---|---|---|---|
| 5,889,935 | A * | 3/1999 | Ofek | G06F 11/2066 709/217 |
| 5,901,327 | A * | 5/1999 | Ofek | G06F 11/2066 709/232 |
| 5,911,042 | A * | 6/1999 | Kugue | G06F 21/85 726/19 |
| 6,044,444 | A * | 3/2000 | Ofek | G06F 11/2066 710/1 |
| 6,052,797 | A * | 4/2000 | Ofek | G06F 11/2064 709/219 |
| 6,510,522 | B1 * | 1/2003 | Heinrich | G06F 21/78 710/100 |
| 6,704,808 | B2 * | 3/2004 | Kasamatsu | G06F 1/1632 710/10 |
| 7,103,909 | B1 * | 9/2006 | Kondo | G06F 21/31 713/1 |
| 7,178,167 | B1 * | 2/2007 | Katoh | G06F 21/31 726/16 |
| 8,233,882 | B2 * | 7/2012 | Rogel | G06F 21/31 455/411 |
| 8,245,054 | B2 * | 8/2012 | Hajji | G06F 21/33 713/183 |
| 8,695,087 | B2 * | 4/2014 | Priel | 713/165 |
| 2001/0016905 | A1 * | 8/2001 | Kasamatsu | G06F 1/1632 713/100 |
| 2002/0112183 | A1 * | 8/2002 | Baird, III | H04L 63/083 726/9 |
| 2003/0070102 | A1 * | 4/2003 | Kondo | G06F 21/31 726/23 |
| 2004/0039911 | A1 * | 2/2004 | Oka et al. | 713/175 |
| 2006/0075476 | A1 * | 4/2006 | Hajji | G06F 21/33 726/6 |
| 2008/0010453 | A1 * | 1/2008 | Hamid | G06F 21/31 713/159 |

FOREIGN PATENT DOCUMENTS

| | | |
|---|---|---|
| JP | 2009187445 A | 8/2009 |
| JP | 2010122774 A | 6/2010 |

OTHER PUBLICATIONS

Chang et al.; Bigtable: A Distributed Storage System for Structured Data; Published in: Journal ACM Transactions on Computer Systems (TOCS) TOCS Homepage archive; vol. 26 Issue 2, Jun. 2008; ACM Digital Library.*

* cited by examiner

BOOT PROGRAM ~200

PASSWORD UNLOCK PROCESSING ~201

FIRMWARE LOAD PROCESSING ~202

FIG.3

MANAGEMENT REGION ~300

SERIAL NUMBER ~301

LOCK SETTING INFORMATION ~302

PASSWORD REVISION ~303

DATA REGION ~310

FIRMWARE ~311

RECOVERY PROCESSING FROM SLEEP STATE ~312

PASSWORD UNLOCK PROCESSING ~313

DATA ~314

INFORMATION PROCESSING APPARATUS, METHOD FOR RELEASING RESTRICTION ON USE OF STORAGE DEVICE, AND STORAGE MEDIUM

BACKGROUND OF THE INVENTION

1. Field of the Invention

Aspects of the present invention generally relate to an information processing apparatus for releasing restriction on use of a storage device with authentication information.

2. Description of the Related Art

A storage device, such as a hard disk drive (HDD), in an information processing apparatus stores user data and programs. When the user data can be freely obtained from the storage device, information can be leaked. When a program in the storage device can be freely rewritten, the information processing apparatus can execute an erroneous operation.

Japanese Patent Application Laid-Open No. 2006-23943 discusses a technique for limiting access to the storage device by setting a password in the storage device.

Even when the information processing apparatus generates the password with a predetermined algorithm and sets the password in the storage device, if the algorithm is analyzed and then the password is freely generated, the storage device can be accessed without any restrictions. When the algorithm is analyzed, the algorithm for generating the password needs to be changed.

However, in the information processing apparatus configured to generate the password according to the algorithm, when the algorithm is changed, the password to be generated is also changed. Thus, the information processing apparatus cannot release the lock on the storage device.

Further, when the information processing apparatus includes a plurality of programs for generating the password and different programs are used depending on the situation, if the algorithm varies depending on the program in use, the generated password also varies. In such a case, too, the information processing apparatus may not be able to release the lock on the storage device.

SUMMARY OF THE INVENTION

According to an aspect of the present invention, an information processing apparatus includes an authentication information storage unit configured to store authentication information for releasing restriction on use of a storage device, a release unit configured to release the restriction on use of the storage device based on the authentication information, a generation unit configured to generate new authentication information for releasing the restriction on use of the storage device, and a setting unit configured to, after the restriction on use of the storage device is released, set the new authentication information in the storage device.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
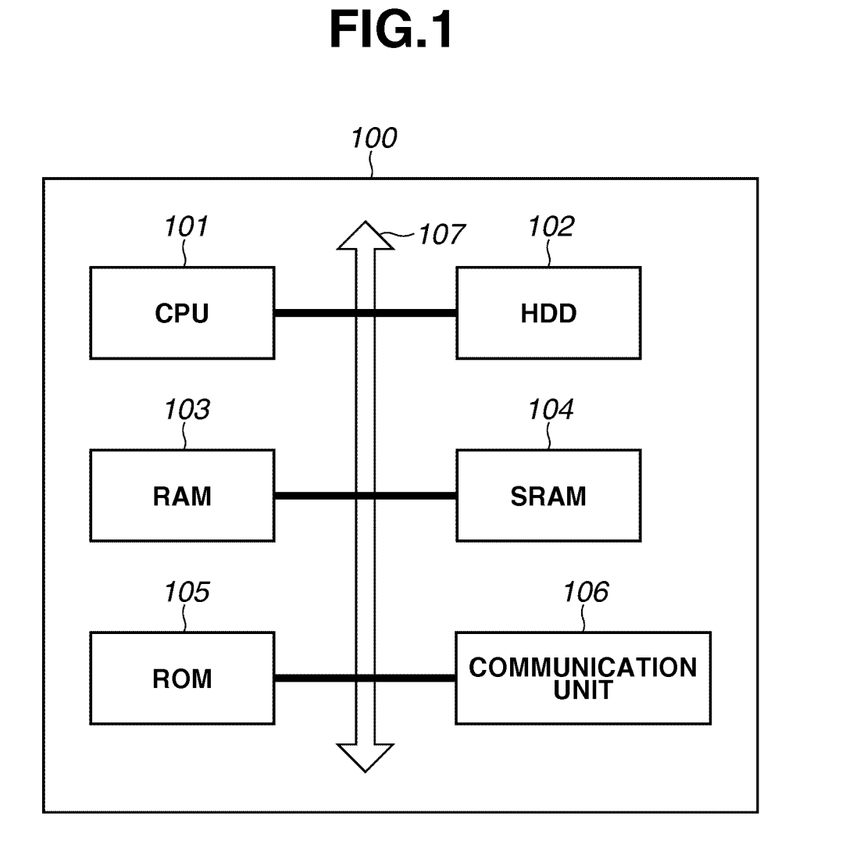
FIG. 1 is a block diagram illustrating a configuration of an information processing apparatus according to an exemplary embodiment.

FIG. 1 is a block diagram illustrating a configuration of an information processing apparatus according to an exemplary embodiment of the present invention. An information processing apparatus 100 includes a central processing unit (CPU) 101, a HDD 102, a random access memory (RAM) 103, a static RAM (SRAM) 104, a ROM 105, and a communication unit 106. The information processing apparatus 100 may further include a display unit and an operation unit.

The CPU 101 executes a program read from the HDD 102 into the RAM 103 to control devices connected to a system bus 107. Further, the CPU 101 executes various types of information processing according to the program.

The HDD 102 is a non-volatile storage device, and stores a firmware program (hereinafter, referred to as "firmware") and data. Even when power supply to the HDD 102 is stopped, the HDD 102 retains the firmware and the data. Further, the HDD 102 responds to various types of commands complying with the advanced technology attachment (ATA) standard. While the present exemplary embodiment refers to an HDD, other non-volatile storage devices may be used. For example, a solid state drive (SSD).

The HDD 102 includes a lock function. When the power supply to the HDD 102 is turned off, the HDD 102 is locked. When the HDD 102 is locked, the CPU 101 releases the lock on the HDD 102 using a password. If the lock on the HDD 102 is not released, the CPU 101 cannot write/read the data onto/from the HDD 102. In other words, when the HDD 102 is locked, usage of the HDD 102 is limited. The password functions as authentication information for releasing the restriction on use of the HDD 102.

The RAM 103 functions as a main memory and a work area for the CPU 101. The SRAM 104 drives itself based on a power supplied from a battery (not illustrated) and stores data. The SRAM 104 functions as an authentication information storage unit storing the password for releasing the lock on the HDD 102. Further, the SRAM 104 functions as an identification information storage unit storing the identification information about the algorithm used to generate the password. A non-volatile storage device different from the SRAM may be used as the authentication information storage unit and the identification information storage unit.

The ROM 105 stores a boot program. When power is supplied to the information processing apparatus, the boot program controls the CPU 101 so that the CPU 101 can execute the firmware stored in the HDD 102.

After the boot program and the firmware are read from the ROM 105 or the HDD 102 into the RAM 103, the CPU 101 operates based on the boot program or the firmware.

The communication unit 106 communicates with an external apparatus via a local area network (LAN), the universal serial bus (USB), a wireless LAN, or any other type of communication interface.

Figure 2:
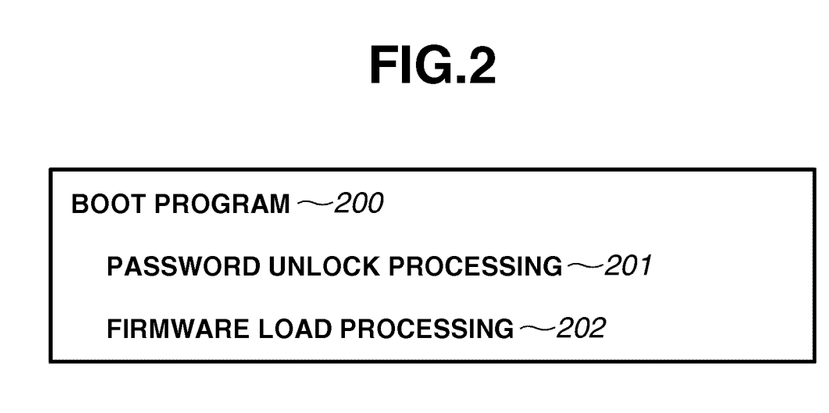
FIG. 2 is a schematic diagram illustrating a data structure of a read only memory (ROM).

FIG. 2 is a schematic diagram illustrating a data structure of the ROM 105. The ROM 105 stores a boot program 200 for reading the firmware in the HDD 102 into the RAM 103. The boot program 200 includes password unlock processing 201 and firmware load processing 202.

The password unlock processing 201 releases a password lock on the HDD 102. Further, the password unlock processing 201 includes a function for generating the password based on an algorithm for generating the password (hereinafter, referred to as the "password generation algorithm"). When the password generation algorithm is different, the associated generated password is different.

The firmware load processing 202 reads the firmware from the HDD 102 into the RAM 103. The boot program 200 includes other processing than that described above, but is not described herein.

Figure 3:
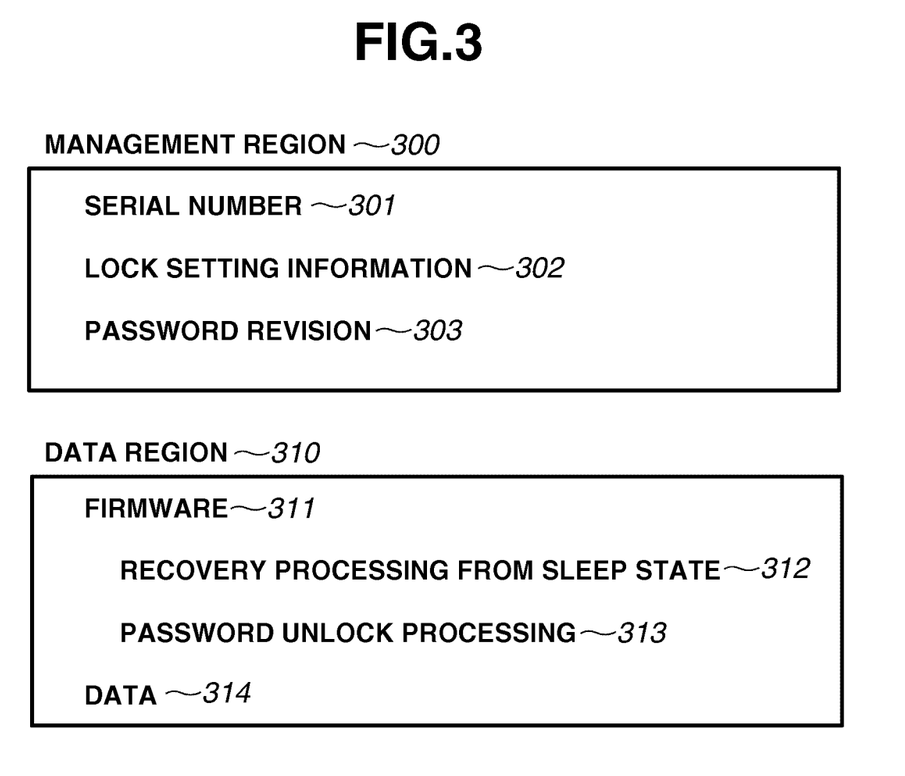
FIG. 3 is a schematic diagram illustrating a data structure of a hard disk drive (HDD).

FIG. 3 is a schematic diagram illustrating a data structure of the HDD 102. The HDD 102 is divided into a management region 300 and a data region 310. The password for the HDD 102 is stored in a region different from the management region 300 or the data region 310. The management region 300 stores a serial number 301, lock setting information 302, and a password revision 303. The data region 310 stores firmware 311 and data 314. The data region 310 includes recovery processing from sleep state 312 and password unlock processing 313.

The serial number 301 is the identification information for identifying the HDD 102. The lock setting information 302 indicates whether the data region 310 is locked with the password. The password revision 303 is information indicating a version of the password. The management region 300 stores information other than that described above.

The firmware 311 is a program executed by the CPU 101 and makes the information processing apparatus 100 operate. The recovery processing from sleep state 312 returns the information processing apparatus 100 from a power saving state (sleep state).

According to the present exemplary embodiment, when the information processing apparatus 100 is in the power saving state, power is not supplied to the CPU 101, the HDD 102, and the ROM 105 from a predetermined commercial power source, but power is supplied to the RAM 103 and the communication unit 106 from the commercial power source. The power is supplied to the SRAM 104 from a battery. When a power switch is turned off, the power is not supplied to the CPU 101, the HDD 102, the RAM 103, the ROM 105, and the communication unit 106 from the commercial power source. Even in such a case, the power is supplied to the SRAM 104 from the battery.

The password unlock processing 313 releases the password lock on the HDD 102. Data 314 includes various types of data.

Figure 4:
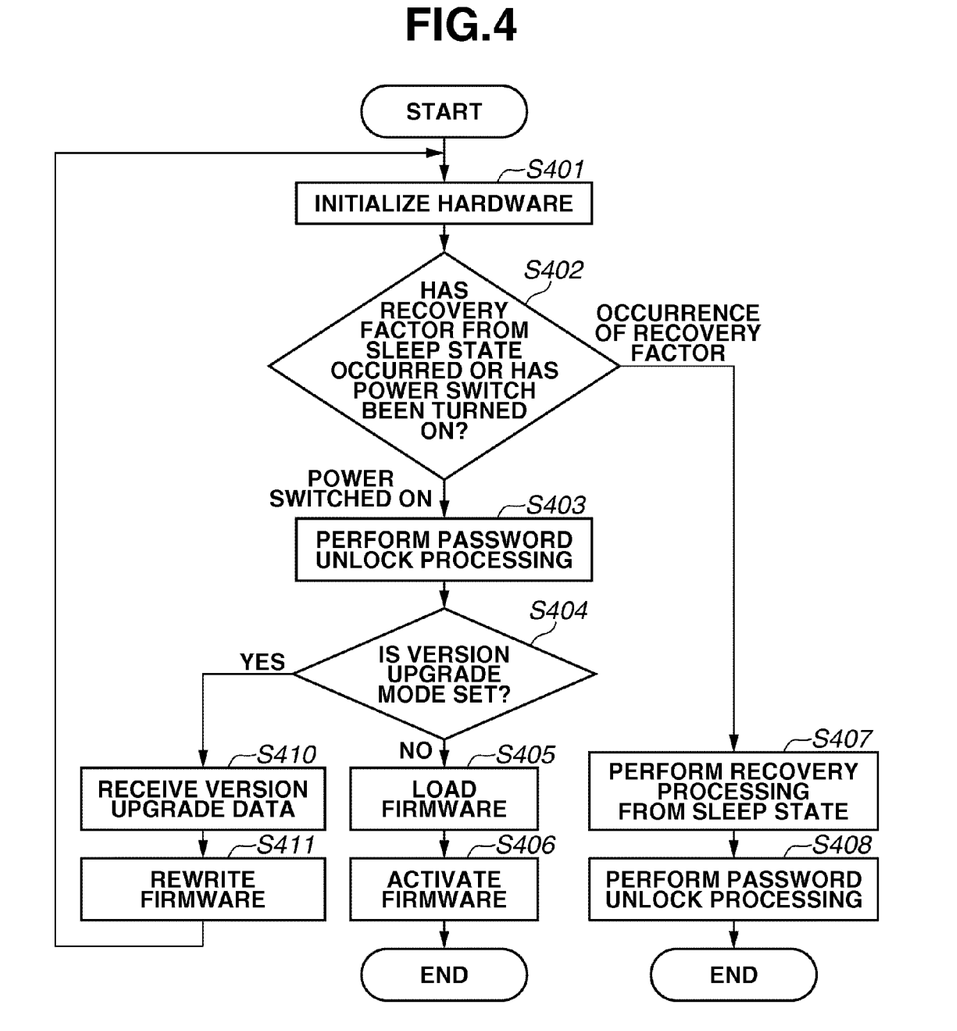
FIG. 4 illustrates a flow of activation processing by the information processing apparatus.
Figure 5:
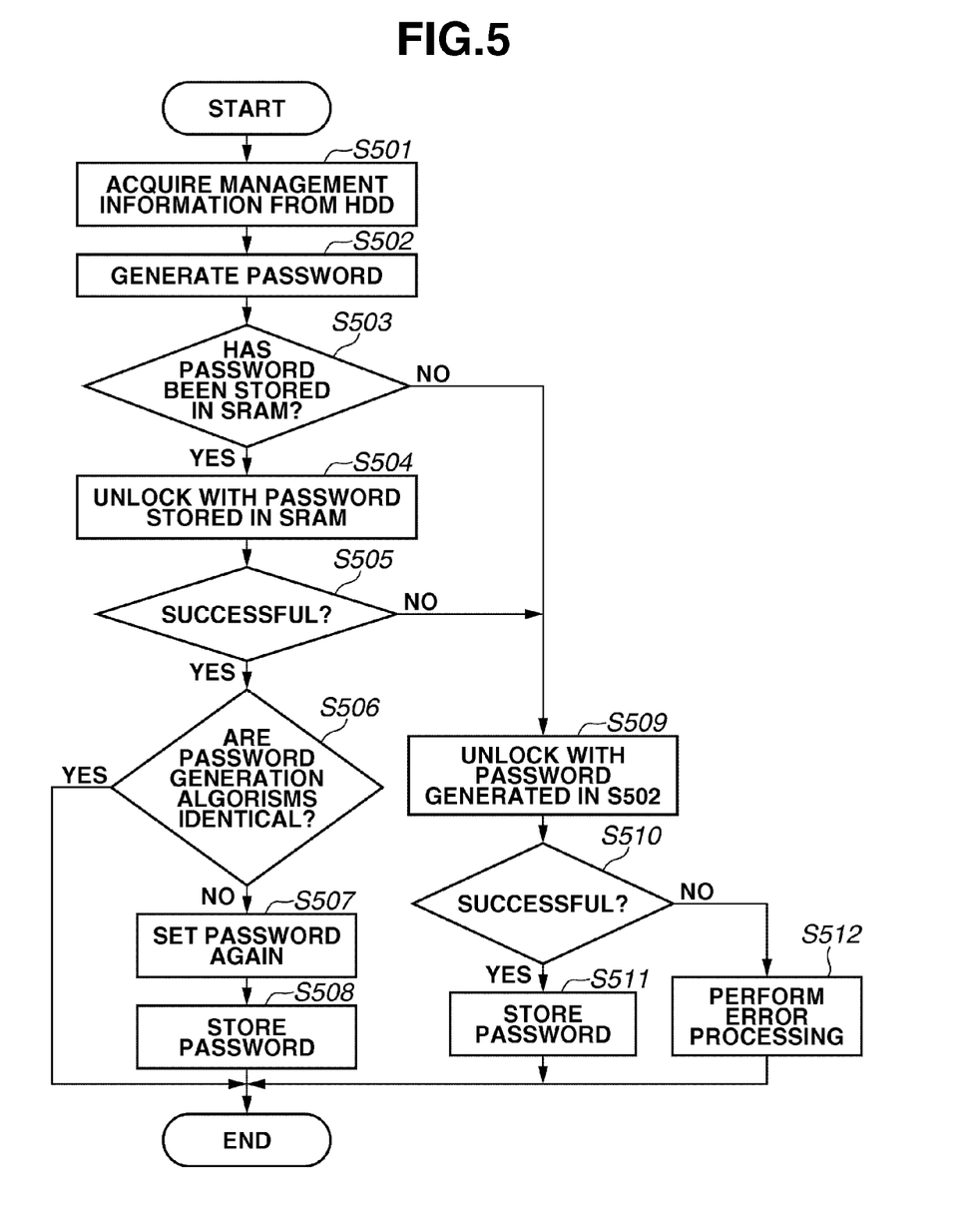
FIG. 5 illustrates a flow of password unlock processing.

FIGS. 4 and 5 illustrate the processing for releasing the password lock on the HDD 102.

FIG. 4 illustrates a flow of activation processing by the information processing apparatus. When the power switch of the information processing apparatus 100 is turned on, or a factor for recovering the information processing apparatus 100 from the power saving state (hereinbelow, referred to as a "recovery factor") occurs, in step S401, the CPU 101 initializes hardware according to the boot program 200. The recovery factor includes a case where the communication unit 106 receives data from an external apparatus.

In step S402, the CPU 101 determines whether the power switch is turned on or the recovery factor has occurred according to the boot program 200.

When the power switch is turned on, in step S403, the CPU 101 executes the password unlock processing 201 according to the boot program 200. Subsequently, in step S404, the CPU 101 refers to the SRAM 104 to determine whether a version upgrade mode is set according to the boot program 200. The SRAM 104 stores information indicating whether to activate the information processing apparatus 100 in the version upgrade mode.

When the version upgrade mode is not set (NO in step S404), in step S405, according to the boot program 200, the CPU 101 executes the firmware load processing 202 to read the firmware 311 from the HDD 102 into the RAM 103. In step S406, the CPU 101 activates the firmware 311. Subsequently, the CPU 101 operates according to the firmware 311.

When the version upgrade mode is set (YES in step S404), in step S411, according to the boot program 200, the CPU 101 receives the version upgrade data from the external apparatus. The external apparatus includes other information processing apparatus and external storage medium. In step S411, the CPU 101 rewrites a portion in the firmware 311 corresponding to the version upgrade data with the version upgrade data. In addition to the firmware, the CPU 101 may rewrite part of the boot program 200 with the version upgrade data.

The entire new firmware program may be received as the version upgrade data, and then the entire firmware 311 may be rewritten with the new firmware.

When the version of the boot program 200 or the firmware 311 is upgraded, the CPU 101 stores in the SRAM 104 information indicating that the information processing apparatus is not activated in the version upgrade mode, and then the processing returns to step S401.

When the recovery factor occurs, in step S407, according to the firmware 311 already read into the RAM 103, the CPU 101 executes the recovery processing from sleep state 312. In step S408, the CPU 101 executes the password unlock processing 313 according to the firmware 311. Subsequently, the CPU 101 returns to the previous state of the power saving state, and then operates according to the firmware 311.

FIG. 5 illustrates a flow of the password unlock processing 201 and the password unlock processing 313. The password unlock processing releases the password lock on the HDD 102 so that the data 314 stored in the HDD 102 can be read and written. According to the present exemplary embodiment, the password unlock processing 201 and the password unlock processing 313 are identical. The CPU may function as a release unit for releasing the password lock on the HDD 102, a generation unit for generating the password, a setting unit for setting the password to the HDD 102 and so on, by executing the password unlock processing 201 and/or the password unlock processing 313.

In step S501, the CPU 101 issues a command to the HDD 102 and acquires management information stored in the management region 300. The management information includes the serial number 301, the lock setting information 302, and the password revision 303.

In step S502, according to password generation algorithm, the CPU 101 generates the password. Step S502 is typically performed prior to step S506 and step S509. In the password generation algorithm, the serial number 301 is input into the generally known hash algorithm such as Message Digest Algorithm 5 (MD5) and Secure Hash Algorithm (SHA) and part of data sequence acquired from the hash algorithm is used as the password. The change in the hash algorithm, information to be used as input data, or a portion of the data sequence to be used as the password indicates the change in the password generation algorithm is changed. The CPU 101 temporarily stores in the RAM 103 the password generated in step S502.

In step S503, the CPU 101 determines whether the password is already stored in the SRAM 104. When the password is stored in the SRAM 104 in step S508 or step S511 described below (YES in step S503), the CPU 101 determines that the password is stored in the SRAM 104.

When the password is already stored in the SRAM 104, in step S504, the CPU 101 issues the password stored in the SRAM 104 and the command to the HDD 102, and then attempts to unlock the password using the password stored therein. When the password stored in the SRAM 104 is encrypted, the CPU 101 decrypts the password and then issues the password to the HDD 102. In step S505, the CPU 101 confirms a response from the HDD 102 to determine whether the unlocking is successfully performed.

When the unlocking is successfully performed (YES in step S505), then in step S506, the CPU 101 determines whether the current password generation algorithm and the password generation algorithm generating the password stored in the SRAM 104 are identical. A determination method will be described below.

When the password generation algorithms are identical (YES in step S506), the processing ends. When the password generation algorithms are not identical (NO in step S506), then in step S507, the CPU 101 issues the password generated in step S502 and the command to the HDD 102, and sets the password generated in step S502 as the password for the HDD 102. Thus, the password for the HDD 102 is changed. In step S508, the CPU 101 stores the password generated in step S502 in the SRAM 104.

When the password is not stored in the SRAM 104 (NO in step S503), then in step S509, the CPU 101 issues the password generated in step S502 and the command to the HDD 102, and then attempts to unlock the password with the password generated therein. Also, when the unlocking is not successfully performed in step S504 (NO in step 505), then in step S509, the CPU 101 attempts to unlock the password using the password generated in step S502. In step S510, the CPU 101 confirms the response from the HDD 102 to determine whether the unlocking is successfully performed.

When the unlocking is successfully performed (YES in step S510), then in step S511, the CPU 101 stores the password generated in step S502 in the SRAM 104. When the unlocking is not successfully performed (NO in step S510), then in step S512, the CPU 101 performs predetermined error processing. In the error processing, for example, a message indicating unsuccessful unlocking is displayed on a display unit.

The determination method performed in step S506 will be described below. Three methods are provided for determining whether the current password generation algorithm and the password generation algorithm for generating the password stored in the SRAM 104 are identical.

According to a first method, the password generated in step S502 is compared with the password stored in the SRAM 104. When the passwords correspond to each other, it is determined that the password generation algorithms are identical.

According to a second method, a version number of the current password generation algorithm is compared with a version number of the password generation algorithm for generating the password stored in the SRAM 104. When the version numbers correspond to each other, it is determined that the password generation algorithms are identical. The version number of the current password generation algorithm is included in the firmware 311. The version number of the password generation algorithm for generating the password stored in the SRAM 104 is stored in the SRAM 104. When the second method is used, in step S508 or step S511, the version number of the password generation algorithm is stored in the SRAM 104 together with the password. The version number is an example of the identification information for identifying the password generation algorithm. The identification information may include a character instead of the number.

According to a third method, similarly to the second method, the version number of the current password generation algorithm is compared with the version number of the password generation algorithm for generating the password stored in the SRAM 104. However, according to the third method, the version number of the password generation algorithm for generating the password stored in the SRAM 104 is stored in the HDD 102 as the password revision 303. When the third method is used, in step S507, the version number of the password generation algorithm is issued to the HDD 102 together with the password.

A case where inconsistency between the password generation algorithms occurs will be described below.

In a first case, the version of the firmware or the boot program is upgraded and thus the password generation algorithm is changed after the version is upgraded. In FIG. 4, only the version upgrade of the firmware or the boot program is illustrated. However, the version of the firmware or the boot program may be downgraded. Also, in this case, the inconsistency between the password generation algorithms occurs.

In a second case, the password generation algorithm of the boot program and the password generation algorithm of the firmware are different. Typically, the boot program and the firmware use the same password generation algorithm. However, when the versions of both the boot program and the firmware are to be upgraded and one of them fails, the password generation algorithm of the boot program is different from that of the firmware. For example, when the power is stopped unexpectedly in middle of upgrading the version, the version upgrade can fail.

Further, when the HDD 102 is replaced with another one, the password generation algorithm of the firmware stored in the new HDD 102 maybe different from the password generation algorithm of the boot program.

According to the present exemplary embodiment, the password generation algorithm can be changed. Further, even when password generation algorithm is changed and thus the password is changed, the information processing apparatus 100 can release the lock on the HDD 102.

According to embodiments of the present invention, the authentication information for releasing the restriction on use of the storage device can be changed, and also, even when the authentication information is changed, the information processing apparatus can release the restriction on use of the storage device.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-274605 filed Dec. 15, 2011, which is hereby incorporated by reference herein in its entirety.

What is claimed is:

1. An information processing apparatus comprising:
a data storage hardware device configured to store data, the data storage hardware device having a lock function with which access to the data is restricted unless a password previously set is input, the password being a password generated according to a first password generation algorithm, based on identification information of the data storage hardware device;
a password storage hardware unit configured to store the password;
a program storage hardware unit configured to store a program; and
a controller configured to release the lock function, using the password which has been stored in the password storage hardware unit,
wherein the controller is configured to newly generate a password based on the identification information of the data storage hardware device, and after releasing the lock function using the password which has been stored in the password storage hardware unit, replace a previous password with the newly generated password and control the password storage hardware unit to store the newly generated password,
wherein the controller is configured to newly generate the password by executing the program in the program storage hardware unit, and
wherein the program is rewritable and the controller is configured to execute a re-written program to newly generate the password.

2. The information processing apparatus according to claim 1, wherein the controller is configured to, if the newly generated password differs from the password which has been stored in the password storage hardware unit, set the newly generated password to the data storage hardware device, and then control the password storage hardware unit to store the newly generated password.

3. The information processing apparatus according to claim 1, wherein the controller is configured to compare the newly generated password with the password which has been stored in the password storage hardware unit.

4. The information processing apparatus according to claim 1,
wherein the data storage hardware device is configured to store algorithm information corresponding to the first password generation algorithm, and
wherein the controller is configured to compare the algorithm information stored in the data storage hardware device with algorithm information corresponding to the second password generation algorithm used to generate the newly generated password.

5. The information processing apparatus according to claim 1, wherein the password, stored in the password storage hardware unit, has been encrypted.

6. The information processing apparatus according to claim 1, wherein the identification information of the data storage hardware device is a serial number of the data storage hardware device.

7. A method performed by an information processing apparatus for releasing restriction on use of a data storage hardware device, the method comprising:
the data storage hardware device having a lock function with which access to the data is restricted unless a password previously set is input, the password being a password generated according to a first password generation algorithm, based on identification information of the data storage hardware device, the method performed in an operating environment that includes a processor and a memory having a program storage unit that stores a program of instructions executable by the processor to perform the method, the method further comprising:
storing the password in a password storage hardware unit;
performing control to release the lock function using the password which has been stored in the password storage hardware unit;
wherein the control, newly generates a password based on the identification information of the data storage hardware device, and after releasing the lock function using the password which has been stored in the password storage hardware unit, replaces a previous password with the newly generated password and controls the password storage hardware unit to store the newly generated password,
wherein the control newly generates the password by executing the program,
wherein the program of instructions is rewritable and the control executes a re-written program to newly generate the password, and
wherein the processor executes the program to perform the storing and the control.

8. A non-transitory computer-readable storage medium having a program storage unit storing a program that when executed by a computer causes the computer to execute a method for releasing restriction on use of a data storage hardware device, the method comprising:
the data storage hardware device having a lock function with which access to the data is restricted unless a password previously set is input, the password being a password generated according to a first password generation algorithm, based on identification information of the data storage hardware device, the method further comprising:
storing the password in a password storage hardware unit;
performing control to release the lock function using the password which has been stored in the password storage hardware unit;
wherein the control newly generates a password based on the identification information of the data storage hardware device, and after releasing the lock function using the password which has been stored in the password storage hardware unit, replaces a previous password with the newly generated password and controls the password storage hardware unit to store the newly generated password,
wherein the control newly generates the password by executing the program, and
wherein the program of instructions is rewritable and the control executes a re-written program to newly generate the password.

* * * * *